(12) United States Patent
Fujita et al.

(10) Patent No.: US 10,259,385 B2
(45) Date of Patent: Apr. 16, 2019

(54) VEHICULAR DISPLAY DEVICE

(71) Applicant: DENSO CORPORATION, Kariya, Aichi-pref. (JP)

(72) Inventors: Katsumi Fujita, Kariya (JP); Satoru Tamura, Kariya (JP); Seigo Tane, Kariya (JP)

(73) Assignee: DENSO CORPORATION, Kariya, Aichi-Pref. (JP)

( * ) Notice: Subject to any disclaimer, the term of this patent is extended or adjusted under 35 U.S.C. 154(b) by 0 days.

(21) Appl. No.: 15/604,840

(22) Filed: May 25, 2017

(65) Prior Publication Data

US 2018/0339647 A1    Nov. 29, 2018

(51) Int. Cl.
| | |
|---|---|
| *B60Q 3/14* | (2017.01) |
| *B60Q 3/64* | (2017.01) |
| *F21V 8/00* | (2006.01) |
| *G01D 13/26* | (2006.01) |

(52) U.S. Cl.
CPC ............ *B60Q 3/14* (2017.02); *B60Q 3/64* (2017.02); *G01D 13/265* (2013.01); *G02B 6/0011* (2013.01)

(58) Field of Classification Search
CPC .......... B60Q 3/14; B60Q 3/64; G01D 13/265; G01D 11/28; G02B 6/0011
See application file for complete search history.

(56) References Cited

U.S. PATENT DOCUMENTS

| | | | | |
|---|---|---|---|---|
| 7,571,696 | B1 * | 8/2009 | Fong | G01C 21/26 116/286 |
| 9,739,646 | B2 * | 8/2017 | Suess | G01D 11/28 |
| 9,902,268 | B2 * | 2/2018 | Nojiri | B60K 35/00 |
| 2008/0285256 | A1 * | 11/2008 | Mezouari | G01D 11/28 362/23.13 |
| 2011/0038137 | A1 * | 2/2011 | Ishikawa | G01D 11/28 362/23.14 |
| 2012/0056736 | A1 | 3/2012 | Katoh | |
| 2016/0189345 | A1 | 6/2016 | Fujita et al. | |
| 2017/0072800 | A1 * | 3/2017 | Fujita | B60K 35/00 |
| 2018/0066967 | A1 * | 3/2018 | Sumiya | G01D 13/04 |
| 2018/0134159 | A1 * | 5/2018 | Tane | B60K 35/00 |

FOREIGN PATENT DOCUMENTS

| | | |
|---|---|---|
| JP | S51138157 U | 11/1976 |
| JP | S55039284 Y | 9/1980 |
| JP | S58146740 U | 10/1983 |
| JP | H09318399 A | 12/1997 |
| JP | 2003302262 A | 10/2003 |
| JP | 2005083847 A | 3/2005 |

(Continued)

*Primary Examiner* — Joseph L Williams
*Assistant Examiner* — Jose M Diaz
(74) *Attorney, Agent, or Firm* — Harness, Dickey & Pierce, P.L.C.

(57) ABSTRACT

An information display portion indicates vehicular information relevant to a vehicle. A display plate being translucent is located on a viewing side relative to the information display portion. A reflective portion formed in the display plate is configured to be illuminated in a predetermined shape by light emitted from a light source unit. The reflective portion being illuminated is overlapped on the vehicular information indicated by the information display portion and viewable on the viewing side.

37 Claims, 4 Drawing Sheets

(56) References Cited

FOREIGN PATENT DOCUMENTS

| | | | |
|---|---|---|---|
| JP | 2007-187576 A | 7/2007 | |
| JP | 2008292219 A | 12/2008 | |
| JP | 2009-192434 A | 8/2009 | |
| JP | 2010-048614 A | 3/2010 | |
| JP | 2010210255 A | 9/2010 | |
| JP | 2012-032286 A | 2/2012 | |
| JP | 2012-058027 A | 3/2012 | |
| JP | 2013-137440 A | 7/2013 | |
| JP | 2016-121890 A | 7/2016 | |
| JP | 2016-121891 A | 7/2016 | |
| JP | 2016-122002 A | 7/2016 | |
| JP | WO 2016199367 A1 * | 12/2016 | ............. B60K 35/00 |
| WO | WO-2015/182664 A1 | 12/2015 | |
| WO | WO-2016/009598 A1 | 1/2016 | |

* cited by examiner

VEHICULAR DISPLAY DEVICE

CROSS REFERENCE TO RELATED APPLICATION

This application is based on Japanese Patent Application No. 2014-252262 filed on Dec. 12, 2014, the disclosure of which is incorporated herein by reference.

TECHNICAL FIELD

The present disclosure relates to a vehicular display device configured to indicate vehicular information relevant to a vehicle.

BACKGROUND

For example, Patent Literature 1 discloses a conventional vehicular display device. The vehicular display device disclosed in Patent Literature 1 includes pointer display portions and a liquid crystal display portion, which are located in a display region. The pointer display portions are configured to perform analog indication of a vehicle speed, an engine revolution, a remaining fuel quantity, an engine water temperature, and/or the like, respectively, with rotation of a pointer. In addition, the liquid crystal display portion is configured to perform digital indication of a travel distance, an average fuel consumption, a shift position, a warning message, and/or like with an image indicated in a liquid crystal panel.

(Patent Literature 1)

Japanese published unexamined application No. 2012-58027

It is noted that, in such a conventional vehicular display device, the pointer display portion and the liquid crystal display portion are located on a flat display plate in the display region, and therefore, an appearance of the pointer display portion and the liquid crystal display portion would be planar when viewed from a viewer.

SUMMARY

It is an object of the present disclosure to produce a vehicular display device configured to perform indication with sense of depth.

According to an aspect of the present disclosure, a vehicular display device comprises an information display portion configured to indicate vehicular information relevant to a vehicle. The vehicular display device further comprises a first light source unit. The vehicular display device further comprises a first display plate being translucent and located on a viewing side relative to the information display portion. The first display plate has a first reflective portion configured to be illuminated in a first predetermined shape by light from the first light source unit. The first reflective portion being illuminated is overlapped on the vehicular information by the information display portion and viewable on the viewing side.

According to another aspect of the present disclosure, a vehicular display device comprises a display plate including a pointer display portion configured to indicate vehicular information by using a pointer. The vehicular display device further comprises a light source unit. The vehicular display device further comprises an information display portion having a display surface configured to indicate an image of various vehicular information. The vehicular display device further comprises a display plate being translucent and located on a viewing side relative to the display surface. The display plate has a reflective portion on a side, which corresponds to the display surface. The reflective portion is configured to be illuminated in a predetermined shape by light emitted from the light source unit. The reflective portion is overlapped on the image indicated on the display surface and is viewable on the viewing side when being illuminated.

According to another aspect of the present disclosure, a vehicular display device comprises an information display portion having a display surface configured to indicate an image of vehicular information relevant to a vehicle. The vehicular display device further comprises a display plate being translucent, the display plate located on a viewing side relative to the display surface and distant from the display surface. The vehicular display device further comprises a light source unit located on an end side of the display plate in a plate surface direction. The display plate has a reflective portion including a recessed portion. The recessed portion is configured to reflect light, which is emitted from the light source unit and conducted from the end side of the display plate through the display plate, to the viewing side to be illuminated in a predetermined shape. The light reflected by the reflective portion to the viewing side is overlapped on the vehicular information indicated by the information display portion.

According to another aspect of the present disclosure, a vehicular display device comprises a first display plate having a character portion. The vehicular display device further comprises an information display portion having a display surface configured to indicate an image of various vehicular information. The vehicular display device further comprises a second display plate being translucent, the second display plate distant from both the first display plate and the display surface and located on the viewing side. The vehicular display device further comprises a light source unit located on an end side of the second display plate in a plate surface direction and configured to emit light when activated. The second display plate has a reflective portion including a recessed portion at a position corresponding to the character portion. The recessed portion is configured to reflect light from the light source unit toward the viewing side to be illuminated in a predetermined shape. The reflective portion is configured to be overlapped on the character portion and viewable on the viewing side when being illuminated.

According to another aspect of the present disclosure, a vehicular display device comprises a display plate including a character portion. The vehicular display device further comprises an information display portion having a display surface configured to indicate an image of various vehicular information. The vehicular display device further comprises an opening portion though which the display surface is exposed and viewable. The vehicular display device further comprises a light source unit. The vehicular display device further comprises a display plate being translucent, the display plate located on a viewing side relative to the display surface of the information display portion. The display plate has a reflective portion at a position corresponding to the display surface. The reflective portion is configured to be illuminated in a predetermined shape when the light source unit is activated. The reflective portion is configured not to be illuminated in the predetermined shape when the light source unit is deactivated. The reflective portion is overlapped on the image and is viewable on the viewing side when the reflective portion is illuminated. The image is viewable through the display plate when the reflective portion is not illuminated.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION (Embodiments)

As follows, multiple embodiments of the present disclosure will be described with reference to drawings. An element, which has been described in a preceding embodiment, will be denoted with a same referential numeral, and description of the element may be omitted. A part of a configuration may be described in an embodiment, and another part of the configuration may refer to a preceding description, which has been made in a preceding embodiment. Embodiments may be partially or entirely combined together as explicitly indicated. It is noted that, embodiments may be also partially or entirely combined together even without explicit indication of the combination, as long as the combination is possible.

(First Embodiment)

Figure 1:
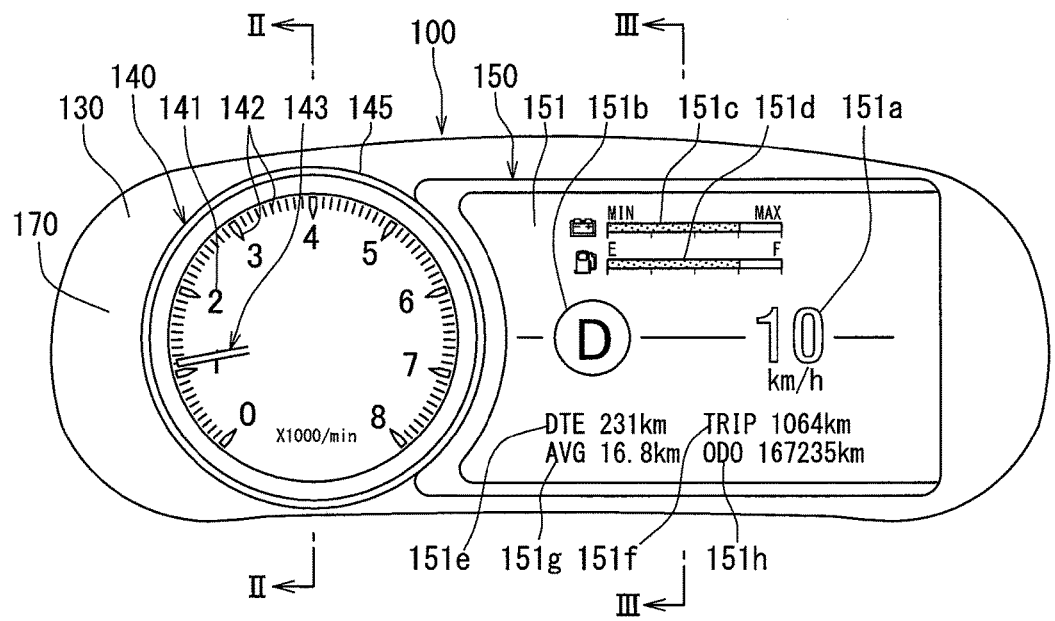
FIG. 1 is a front view showing a combination meter according to an embodiment.
Figure 2:
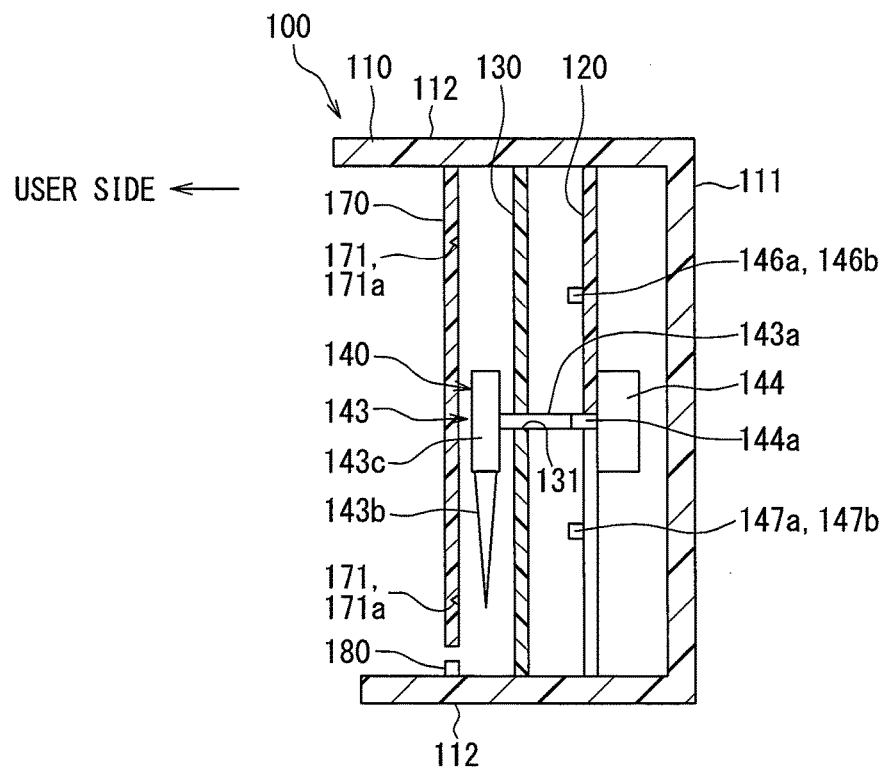
FIG. 2 is a sectional view taken along a line II-II in FIG. 1.
Figure 3:
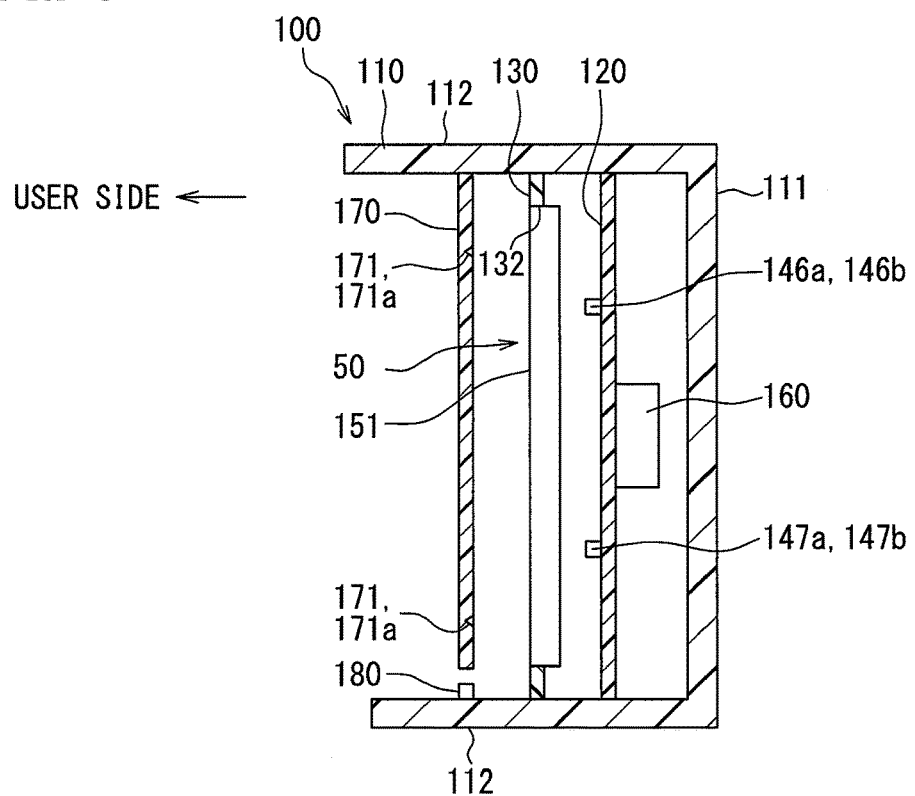
FIG. 3 is a sectional view taken along a line III-III in FIG. 1.
Figure 4:
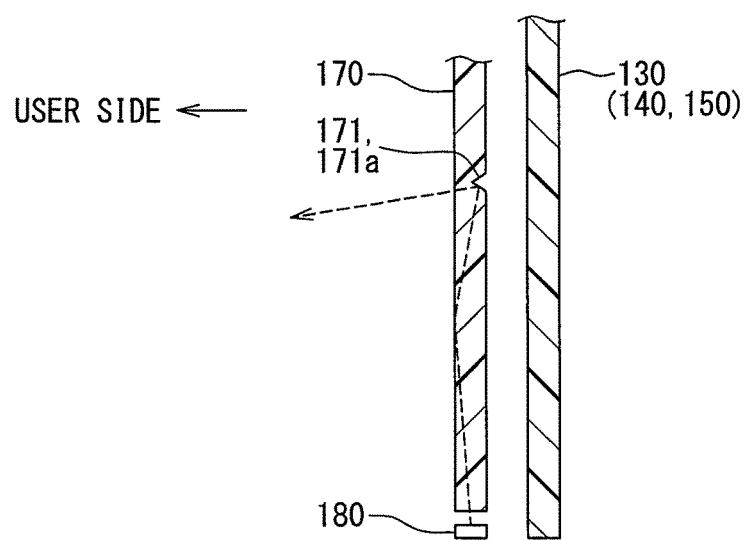
FIG. 4 is an enlarged view showing a reflection unit of a transparent display plate according to an embodiment.
Figure 5:
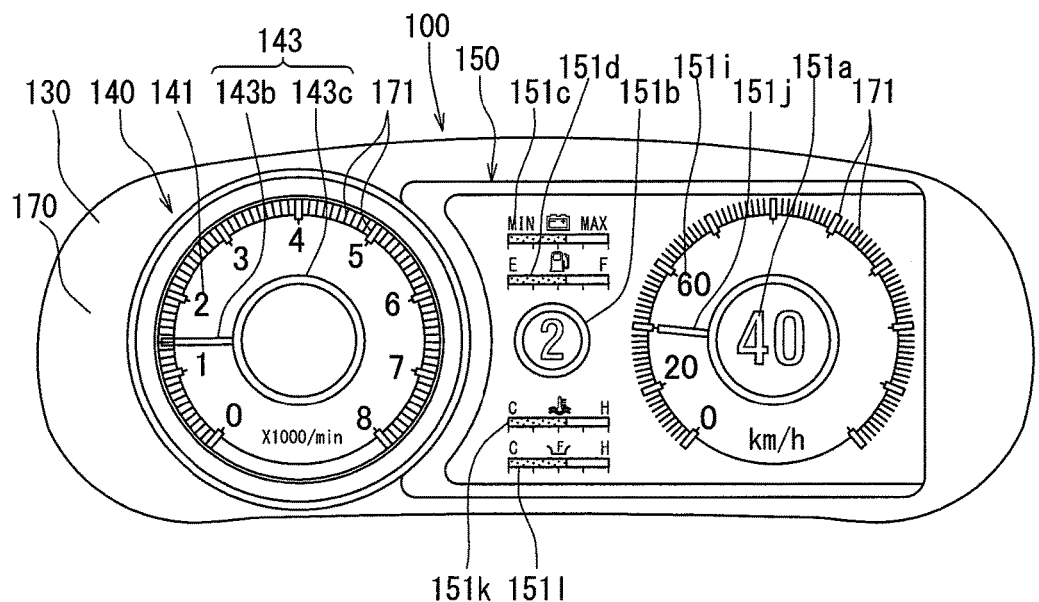
FIG. 5 is a front view showing an operational state of the reflection unit according to an embodiment.

The first embodiment of the present disclosure will be described with reference to FIGS. 1 to 5. A vehicular display device according to the first embodiment is applied to a combination meter 100. As shown in FIGS. 1 and 5, the vehicular display device is configured to indicate various vehicular information, which is relevant to a vehicle, to a user (viewer) of the vehicle. The combination meter (as follows, referred to as meter) 100 is equipped to an instrument panel of the vehicle at a position opposed to a steering wheel of the vehicle.

As shown in FIGS. 1 to 4, the meter 100 includes a case 110, a circuit board 120, a display plate 130, a pointer display portion 140, a liquid crystal display portion 150, a control unit 160, a transparent display plate 170, a light source unit 180, and/or the like.

The case 110 is, for example, a container formed of resin in a bottomed tubular shape as a whole. The case 110 has a front shape viewed from the user side in, for example, an ellipse shape extended in a horizontal direction. The case 110 forms a body of the meter 100. The case 110 has a bottom portion 111 at the bottom. The case 110 further has an outer wall 112 defining an outer circumferential periphery. The user side corresponds to a viewing side of the present disclosure and is on the left side in FIGS. 2 to 4.

The circuit board 120 is formed of, for example, a glass epoxy circuit board or the like. The circuit board 120 forms an electric circuit unit of the meter 100. The circuit board 120 is in an ellipse shape corresponding to the case 110. The circuit board 120 is located on the side of the bottom portion 111 of the case 110. The circuit board 120 is affixed to the outer wall 112. The circuit board 120 is equipped with a motor 144, light sources 146a, 146b, 147a, and 147b, the control unit 160, and the like, which will be described later.

The display plate 130 is a thin plate member in an ellipse shape formed of a translucent material, such as transparent polycarbonate resin or transparent acrylic resin. The display plate 130 is located in the case 110 at a position closer to the user side than the circuit board 120. The display plate 130 is affixed to the outer wall 112. The display plate 130 has a surface on the opposite side (as follows, referred to as counter-user side) of the user. The surface of the display plate 130 on the counter-user side has a portion excluding a digit portion 141 and a tick mark portion 142, which will be described later. This portion of the display plate 130 is applied with a printing paint such as black paint to produce a light blocking effect. The display plate 130 has a surface on the user side, and this surface of the display plate 130 is formed with the pointer display portion 140, the liquid crystal display portion 150, and/or the like, which will be described later. The display plate 130 has a circular opening 131 for a shaft portion 143a of a pointer 143 at a center portion corresponding to the pointer display portion 140. The display plate 130 further has a square opening portion 132 in a region corresponding to the liquid crystal display portion 150.

The pointer display portion 140 serves as a display unit for indicating vehicular information by using the pointer. The pointer display portion may be equivalent to an information display portion of the present disclosure. In the present example, the pointer display portion 140 serves as a portion for indicating an engine rotational speed among various elements of the vehicular information. The pointer display portion 140 is in a circle shape and is located on the left side of the display plate 130. The pointer display portion 140 is equipped with the digit portion 141, the tick mark portion 142, the pointer 143, the motor 144, a decorating portion 145, the light sources 146a, 146b, 147a, and 147b, and the like.

The digit portion 141 and the tick mark portion 142 are formed on the display plate 130 to form numerals and a scale, respectively, for indicating an engine rotational speed. The digit portion 141 and the tick mark portion 142 are located on the radially outer area in a circular region of the pointer display portion 140 and are arranged along the circumferential direction. The digit portion 141 is arranged such that its indication values become greater in order from the lower left side of the pointer display portion 140 in the clockwise direction. The tick mark portion 142 is located on the outside of the digit portion 141. The digit portion 141 and the tick mark portion 142 are formed as portions of the display plate 130 to which the printing paint such as black paint producing the light blocking effect is not applied.

The display plate 130 has a portion, in which the digit portion 141 and the tick mark portion 142 are formed, and this portion has a surface on the counter-user side, which is applied with ink printing such as white ink printing, which produces a diffusion effect of light. The digit portion 141 and the tick mark portion 142 emit light when light from the light sources 146a and 146b, which will be described later, passes therethrough toward the user side. The digit portion 141 and the tick mark portion 142 are configured to become luminous independently by switching to illuminate (activate) the light sources 146a and 146b and to dim (deactivate) the light sources 146a and 146b.

The pointer 143 is a needle rotational in the pointer display portion 140 to point the engine rotation speed. The pointer 143 is formed of a translucent material such as a transparent polycarbonate resin, a transparent acrylic resin, or the like.

The pointer 143 includes the shaft portion 143a, a needle portion 143b, and a cap portion 143c. The shaft portion 143a and the needle portion 143b are integrally formed. The shaft portion 143a is a bar-shaped member extending from the front side of the display plate 130 toward the circuit board 120. The shaft portion 143a is located to extend through the opening 131 of the display plate 130. The needle portion 143b is a bar-shaped member extending along the surface of the display plate 130 from a tip end of the shaft portion 143a on the user side toward the tick mark portion 142. The cap portion 143c is in a flat tubular shape. The cap portion 143c is equipped to cover both the tip end of the shaft portion 143a on the user side and a root portion of the needle portion 143b.

The needle portion 143b and the cap portion 143c are configured to become luminous by using the light sources 147a and 147b, which will be described later. The needle portion 143b and the cap portion 143c are configured to become luminous independently by switching to illuminate (activate) the light sources 147a and 147b and to dim (deactivate) the light sources 147a and 147b.

The motor 144 is an actuator for the pointer to rotate the pointer 143. The motor 144 is located on the surface of a portion of the circuit board 120 on the counter-user side. The portion of the circuit board 120 corresponds to the pointer display portion 140. The motor 144 employs, for example, a stepper motor, which is a synchronous motor operable in synchronization with a pulse power. Rotation of the motor 144 is controlled by using the control unit 160, which will be described later.

The motor 144 includes a shaft 144a extended toward the shaft portion 143a of the pointer 143 and connected with the shaft portion 143a. In the present configuration, the motor 144 rotates the shaft portion 143a, thereby to rotate the needle portion 143b relative to both the display plate 130 and the pointer display portion 140.

The decorating portion 145 is in a cylindrical shape or in a ring shape. The decorating portion 145 is affixed to the surface of the display plate 130 on the user side at the position radially outside both the pointer display portion 140 and the tick mark portion 142. The decorating portion 145 is a member for enhancing the appearance around the outer circumferential periphery of the pointer display portion 140 to the user. The decorating portion 145 is formed of a resin material. The decorating portion 145 is applied with paint in, for example, a metallic color such as silver on its surface.

The light sources 146a, 146b, 147a, and 147b are configured to emit light thereby to illuminate the digit portion 141, the tick mark portion 142, and the pointer 143. The light sources 146a, 146b, 147a, and 147b are equipped to the surface of the circuit board 120 on the user side. The light sources 146a, 146b, 147a, and 147b, employ, for example, light emitting diodes (LEDs), respectively.

The light source 146a is a light source device to illuminate the digit portion 141. The light source 146b is a light source device to illuminate the tick mark portion 142. Each of the light sources 146a and 146b includes multiple elements arranged in the circumferential direction. The light sources 146a and 146b are equipped correspondingly to the digit portion 141 and the tick mark portion 142, respectively. The light source 147a is a light source device to illuminate the needle portion 143b. The light source 147b is a light source device to illuminate the cap portion 143c. As to be described later, the control unit 160 is configured to control activation (lighting on) and deactivation (lighting off) of each of the light sources 146a, 146b, 147a, and 147b.

The liquid crystal display portion 150 serves as a display unit to indicate various vehicular information with a digital image. The liquid crystal display portion 150 may be equivalent to an information display portion of the present disclosure. The liquid crystal display portion 150 includes a liquid crystal panel 151, a back light device, and/or the like.

The liquid crystal panel 151 employs, for example, a transmissive liquid crystal panel having a dot-matrix configuration including multiple pixels in a form of a matrix array. The liquid crystal panel 151 is located so that its display surface is viewable through an opening portion 132 of the display plate 130. The liquid crystal panel 151 is configured such that each of the pixels is driven by a control signal sent from the control unit 160 thereby to indicate an image representing various vehicular information. Details of the control unit 160 will be described later.

As shown in FIGS. 1 and 5, the liquid crystal panel 151 creates images representing the vehicular information, for example, a vehicle speed image 151a, a shift position image 151b, a charge quantity image 151c, a remaining fuel quantity image 151d, a travelable distance image 151e, a trip distance image 151f, an average fuel consumption image 151g, a travel distance image 151h, a digit image 151i, a pointer image 151j, a water temperature image 151k, an oil temperature image 151l, and/or the like. The digit image 151i and the pointer image 151j are for indicating a vehicle speed together with the vehicle speed image 151a.

The back light is located on the counter-user side of the liquid crystal panel 151. The back light is configured to perform transmissive illumination of the liquid crystal panel 151 from the backside. The backlight includes a light emitting diode and a diffusion plate and has a configuration to uniformly illuminate the liquid crystal panel 151. The light emitted from the back light enables the liquid crystal panel 151 to perform luminescence indication of the image representing the various vehicular information.

The control unit 160 is configured to acquire various vehicle signals from the various sensors and/or the like equipped to the vehicle and to control the pointer display portion 140 and the liquid crystal display portion 150. In this way, the control unit 160 is configured to cause the pointer display portion 140 and the liquid crystal display portion 150 to indicate the vehicular information corresponding to the acquired vehicle signals. The control unit 160 is configured with, for example, a processor, a program, a flash memory, a RAM, and/or the like. The processor performs various kinds of processings. The program is executed by the processor to perform the processings. The flash memory stores information related to the vehicle and the like. The RAM functions as a work area of the processings.

In addition, the control unit 160 includes a drive circuit and a regulator circuit. The drive circuit is for controlling rotation of the motor 144. The regulator circuit is for controlling luminescence of the light sources 146a, 146b, 147a, and 147b. In addition, the control unit 160 includes a drive circuit and a regulator circuit. The drive circuit is for controlling each pixel of the liquid crystal panel 151. The regulator circuit is for controlling luminescence of the back light.

The transparent display plate 170 is a plate member having a translucency. The transparent display plate 170 is located on the user side relative to the display plate 130. More specifically, the transparent display plate 170 is located on the user side relative to the pointer display portion 140 and the liquid crystal display portion 150. The transparent display plate 170 is affixed to the outer wall 112. The transparent display plate 170 may be equivalent to a display plate of the present disclosure. The transparent display plate 170 is formed with a reflective portion 171. The reflective portion 171 is configured to become luminous in a predetermined shape by the light emitted from the light source unit 180. The details will be described later.

The reflective portion 171 is formed with an aggregate of a large number of recessed portions 171a each being microscopic. The recessed portions 171a are formed on the surface of the transparent display plate 170 on the counter-user side. That is, the recessed portions 171a are formed on the surface of the transparent display plate 170 on the side of the display portions 140 and 150. The aggregate of the recessed portions 171a forms a predetermined shape, such that the aggregate of the recessed portions 171a form, for example, gages at two places. The two places includes, for example, a position, in which the recessed portions 171a overlaps with the tick mark portion 142 of the pointer display portion 140 when viewed from the user side. The two places further includes, for example, a position, in which the recessed portions 171a overlaps with an outer circumferential periphery of the vehicle speed image 151a of the liquid crystal display portion 150 when viewed from the user side. The gauges formed with the aggregate of the recessed portions 171a enables to give the gauge, for example, a further sporty feeling by increasing density feeling than the tick mark portion 142 in the pointer display portion 140.

Each recessed portion 171a among the aggregate of the large number of the recessed portions 171a has a sectional shape such that the recessed portion 171a is in a tapered shape to reduce in its cross section from the counter-user side toward the user side. As shown in FIG. 4, the sectional shape of the recessed portion 171a is, for example, a triangular shape. More specifically, in this example, the entire shape of each of the recessed portions 171a forms a triangular prism extending in a direction perpendicular to the sheet surface of FIG. 4. In other words, each recessed portion 171a defines a space in a shape of a microscopic prism. A large number of the microscopic recessed portions 171a each having this structure are formed to configure each tick mark of the gauge and further to configure the entire gauge.

The light source unit 180 is configured to illuminate the reflective portion 171 when being activated (energized). The light source unit 180 is located on the side of a tip end of the transparent display plate 170 in a plate surface direction. In the present example, the light source unit 180 is located underneath the transparent display plate 170. The light source unit 180 includes multiple elements arranged in the left to right direction correspondingly to the entire shape (gauge gauge) of the reflective portion 171. The light source unit 180 employs, for example, light emitting diodes (LEDs) in a red color.

As described above, the reflective portion 171 of the transparent display plate 170 is formed with the microscopic recessed portions 171a. Therefore, the reflective portion 171 is substantially not viewable by the user in a state where the light source unit 180 is not activated and is dimmed. That is, in this state, the transparent display plate 170 is viewed as a transparent board in its original form. To the contrary, when the light source unit 180 is activated and lit to emit light, the light is reflected on the slope of the recessed portion 171a in the triangular shape and is caused to reach the user side. In this way, the transparent display plate 170 renders the gauge viewable by the luminescence of the reflective portion 171.

Further, in the present example, the vehicle is equipped with a driving mode selection switch device, which enables alternative selection of either a normal driving mode, in which moderate driving is enabled, or a sports driving mode, in which fun and quick driving is enabled.

The present meter 100 has the above-described configuration. As follows, operation of the meter 100 will be described with reference to FIGS. 1 and 5.

1. Normal Driving Mode (FIG. 1)

The normal driving mode is set when the user selects the normal driving mode by manipulating the driving mode selection switch device.

The control unit 160 activates the light sources 146a and 146b in the pointer display portion 140 thereby to illuminate the digit portion 141 and the tick mark portion 142. In addition, the control unit 160 activates the light source 147a thereby to illuminate the needle portion 143b. Further, the control unit 160 activates the motor 144 to rotate the needle portion 143b according to the rotational speed signal of the engine acquired from the vehicle sensor. The rotational position of the needle portion 143b relative to the tick mark portion 142 and the digit portion 141 represents the engine speed.

In addition, the control unit 160 calculates a vehicle speed value, a shift position, a charge quantity, a remaining fuel quantity, a travelable distance, a trip distance, an average fuel consumption, and a travel distance according to the various vehicle signals acquired from the various sensors for indication of the calculated values on the liquid crystal display portion 150. The control unit 160 processes, as vehicular information, the various images 151a to 151h and causes the liquid crystal panel 151 to indicate the various images 151a to 151h.

In the present normal driving mode, the light source unit 180 is not activated, and thereby the reflective portion 171 of the transparent display plate 170 is not illuminated. Therefore, the indicated contents on the pointer display portion 140 and the liquid crystal display portion 150 are viewed by the user through the transparent display plate 170.

2. Sport Driving Mode (FIG. 5)

The sports driving mode is set when a user selects the sports driving mode by manipulating the driving mode selection switch device.

The control unit 160 activates the light source 146a in the pointer display portion 140 thereby to illuminate only the digit portion 141 among the digit portion 141 and the tick mark portion 142. In addition, the control unit 160 activates the light sources 147a and 147b to illuminate the cap portion 143c in addition to the needle portion 143b.

In addition, the control unit 160 calculates the vehicle speed value, the shift position, the charge quantity, the remaining fuel quantity, a water temperature, and an oil temperature according to the various vehicle signals acquired from the various sensors for indication of the calculated values on the liquid crystal display portion 150. The control unit 160 processes, as vehicular information, the various images 151*a* to 151*d* and 151*i* to 151*l* and causes the liquid crystal panel 151 to indicate the various images 151*a* to 151*d* and 151*i* to 151*l*.

Furthermore, the control unit 160 activates the light source unit 180. In response, the reflective portion 171 (recessed portion 171*a*) in the transparent display plate 170 reflects the light to cause the reflected light to reach the user side. In this way, the reflective portion 171 becomes luminous to form the gauge described above. The light source unit 180 employs the LEDs in the red color, and therefore, the reflective portion 171 (gauge) becomes luminous in the red color, which is suitable for sports driving. The gauge formed by the reflective portion 171 is illuminated, when viewed from the user side, at the position of the tick mark portion 142, which is deactivated and dimmed, in the pointer display portion 140 and at the position of the outer circumferential periphery of the digit image 151*l* of the liquid crystal display portion 150. Therefore, the user views and recognizes the reflective portion 171 superimposed as the gauge on the vehicular information in the pointer display portion 140 and the liquid crystal display portion 150.

Further, the control unit 160 activates the motor 144 to rotate the needle portion 143*b* according to the rotational speed signal of the engine acquired from the vehicle sensor. The rotational position of the needle portion 143*b* relative to the reflective portion 171 and the digit portion represents the engine speed.

In addition, the control unit 160 modifies the position of indication of the pointer image 151*j* relative to the digit image 151*i* in the liquid crystal panel 151 according to the vehicle speed acquired from the vehicle sensor. In this way, the vehicle speed is indicated according to the rotational position of the pointer image 151*j* relative to the gauge formed with the digit image 151*i* and the reflective portion 171. Simultaneously, the vehicle speed is also indicated by the vehicle speed image 151*a*.

As described above, according to the present embodiment, the transparent display plate 170, which has the reflective portion 171, and the light source unit 180 are equipped on the user side of the pointer display portion 140 and the liquid crystal display portion 150. The transparent display plate 170 has a translucency. Therefore, the present configuration enables the vehicular information indicated by each of the display portions 140 and 150 to be viewable through the transparent display plate 170. In addition, the light source unit 180 is activated to illuminate the reflective portion 171 to form the gauge. The projection reflective portion 171 being illuminated is superimposed on the vehicular information in each of the display portions 140 and 150 and is viewable on the user side. Therefore, the present configuration enables indication to cause the user to feel sense of depth.

In addition, the reflective portion 171 is formed in the surface of the transparent display plate 170 on the side of the display portions 140 and 150. The reflective portion 171 is formed with the recessed portion 171*a* which is in a taper shape decreasing in width (in size) to the user side. That is, the recessed portion 171*a* becomes thinner to the user side. The light source unit 180 is located on the end side of the transparent display plate 170 in the plate surface direction.

The present configuration enables to steadily cause the reflective portion 171 to reflect the light emitted from the light source unit 180, which is located on the end side of the transparent display plate 170 in the plate surface direction, to the user side. The plate surface direction is along the main surface of the display plate 170 on which indication is made on the user side. The present configuration need not an installation space for the light source unit 180 in the depth direction.

(Second Embodiment)

Figure 6:
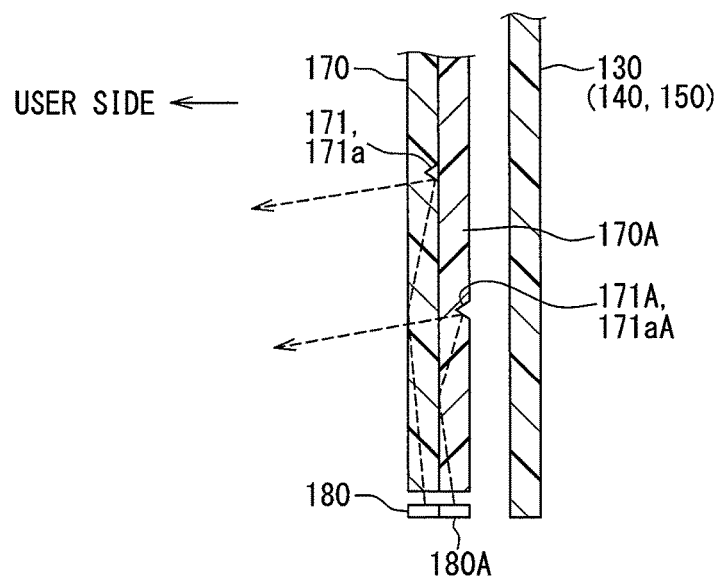
FIG. 6 is an enlarged view showing a transparent display plate and a reflection unit according to an embodiment.
Figure 7:
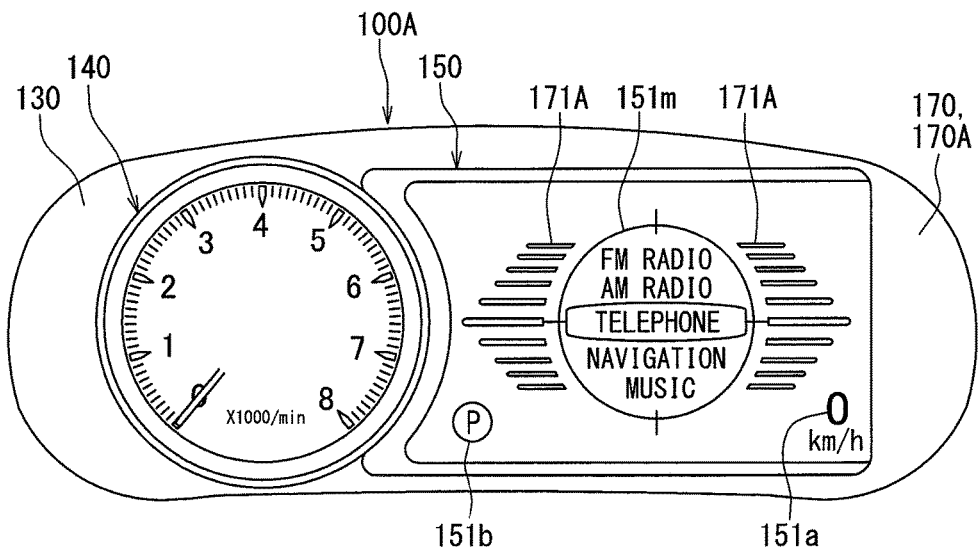
FIG. 7 is a front view showing an operational state of the reflection unit according to an embodiment.

FIGS. 6 and 7 show a meter 100A according to the second embodiment. The second embodiment has a configuration including a combination of the transparent display plate 170, the reflective portion 171, and the light source unit 180 of the first embodiment.

As shown in FIG. 7, the meter 100A includes, in addition to the various images 151*a* to 151*l* of the first embodiment, a menu image 151*m* in the liquid crystal display portion 150. The menu image 151*m* is for selecting operation of an audio device, a cellular-phone connection device, a navigation device, and/or the like. The liquid crystal display portion 150 is configured to indicate the menu image 151*m* in response to manipulation of, for example, a selection switch device by the user. The selection switch device is equipped to, for example, a steering wheel. In addition, the present configuration enables the user to select and operate the device by manipulating the selection switch device while looking at the menu image 151*m*. The present configuration enables the user, for example, to select a radio station, to set free-hands operation of a cellular phone, to set destination guidance of a car navigation device, to cause a CD device to playback a favorite music, and or the like.

The present configuration further has another group of a transparent display plate 170A, the reflective portion 171A, and a light source unit 180A, in addition to the transparent display plate 170, the reflective portion 171, and the light source unit 180 described in the first embodiment. The transparent display plate 170A, the reflective portion 171A, and the light source unit 180A are located at positions corresponding to the menu image 151*m* of the liquid crystal display portion 150.

The one group, which includes the transparent display plate 170, the reflective portion 171, and the light source unit 180, and the other group, which includes the transparent display plate 170A, the reflective portion 171A, and the light source unit 180A, are arranged to be directed from the display plate 130 to the user side. The transparent display plate 170 and the transparent display plate 170A are in contact with each other.

The reflective portion 171A formed in the transparent display plate 170A has a configuration (design) different from that of the reflective portion 171 formed in the transparent display plate 170. More specifically, the reflective portion 171A is an aggregate of a number of the recessed portions 171*a*A The reflective portion 171A is located on each of the right side and the left side of the menu image 151*m* in FIG. 7. The reflective portion 171A form an ornamental portion including multiple horizontal lines arranged in the vertical direction. The reflective portion 171A is configured to become luminous by receiving light from the light source unit 180A.

As follows, operation of the present embodiment will be described. The superimposing indication with the reflective portion 171 in the sports driving mode is the same as that of the first embodiment.

In addition, the control unit 160 causes the liquid crystal display portion 150 to indicate the menu image 151*m* in response to manipulation of the selection switch device, which is equipped to, for example, the steering wheel, by the user. In the present state, the control unit 160 further activates the light source unit 180A to illuminate the reflective portion 171A.

The present embodiment also causes the menu image 151m to enable the user to feel sense of depth by illuminating the reflective portion 171A. In addition, the present configuration enables to switch activation of the light source unit 180 and the light source unit 180A, thereby to enable to switch between the superimposing indication of the gauge in the sports driving mode and the superimposing indication of the ornamental portion of the menu image 151m. In this way, the present configuration enables the user to view the distinct reflective portions 171 and 171A.

(Third Embodiment)

Figure 8:
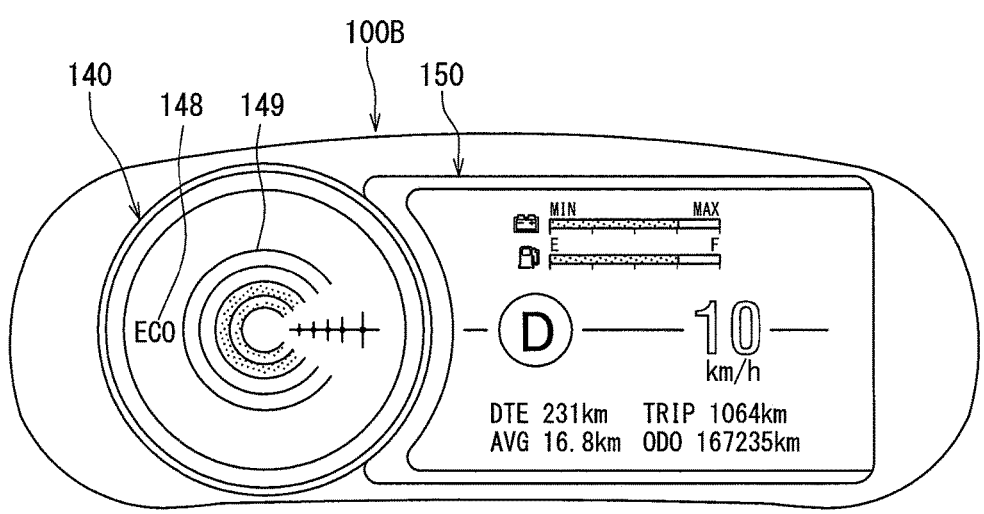
FIG. 8 is a front view showing a pointer display portion according to an embodiment.

FIG. 8 shows a meter 100B according to the third embodiment. In the above embodiments, the pointer display portion 140 is exemplified to indicate the engine speed. It is noted that, as exemplified with the meter 100B of the present embodiment, the pointer display portion 140 may be configured to switch to indicate other vehicular information in addition to or alternative to the engine speed. As shown in FIG. 8, the other vehicular information is, for example, ECO driving information to indicate a level of ECO driving implemented by the user in the normal driving mode.

The display plate 130 corresponding to the pointer display portion 140 is formed with a character portion 148 and an ECO indicating portion 149 in addition to the digit portion 141 and the tick mark portion 142. The character portion 148 indicates that the vehicle is in an ECO driving state. The ECO indicating portion 149 is formed with, for example, multiple rings for indicating an ECO driving operation level. The ECO indicating portion 149 has a center portion, which emits green light when a predetermined ECO driving condition is satisfied. The ECO indicating portion 149 is further configured to enlarge a green region radially outward from the center portion as the ECO driving level becomes higher. The present configuration further includes light sources for the ECO indication to illuminate the character portion 148 and the ECO indicating portion 149, respectively.

According to the present embodiment, the control unit 160 deactivates the light sources 146a, 146b, 147a, and 147b and activates the light source for the ECO indication in the pointer display portion 140 when determining that the driving state of the user is in the ECO driving state in the normal driving mode. In this way, the control unit 160 switches the indication to the ECO indication thereby to indicate the ECO driving information. The present configuration enables to switch indication of the different vehicular information in the same pointer display portion 140.

(Other Embodiment)

In the above embodiments, the reflective portion 171 (recessed portion 171aA), which forms the recessed portion 171a, is exemplified by a configuration in a triangular columnar shape (prism shape). It is noted that, the present disclosure is not limited to the example. The reflective portion 171 (recessed portion 171aA) may be in a conical shape and/or in a polygonal cone shape such as a pyramid shape.

In the embodiments, the pointer display portion 140 is exemplified to indicate the engine speed as the vehicular information. It is noted that, the present disclosure is not limited to the example. The pointer display portion 140 may indicate other vehicular information by using the relationship with various vehicular information indicated on the liquid crystal display portion 150.

As described above, the vehicular display device includes the information display portions 140 and 150 to indicate the vehicular information relevant to the vehicle. The vehicular display device further includes the light source unit 180, the display plate 170, and the reflective portion 171. The display plate 170 is translucent and is located on the viewing side relative to the information display portions 140 and 150. The reflective portion 171 is formed in the display plate 170. The reflective portion 171 is configured to be illuminated by the light from the light source unit 180 in the predetermined shape. The reflective portion 171 being illuminated is overlapped with the vehicular information indicated by the information display portions 140 and 150 and is viewable on the viewing side.

According to the present configuration, the display plate 170 is translucent. Therefore, the original vehicular information indicated by the information display portions 140 and 150 is viewable though the display plate 170. Furthermore, the reflective portion 171 illuminated by the light source unit 180 is superimposed on the vehicular information and is viewed on the viewing side. Therefore, the present configuration enables to add sense of depth to the indication.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A vehicular display device comprising:
an information display portion configured to indicate vehicular information relevant to a vehicle;
a first light source unit; and
a first display plate being translucent and located on a viewing side relative to the information display portion, wherein
the first display plate has a first reflective portion configured to be illuminated in a first predetermined shape by light from the first light source unit, and
the first reflective portion being illuminated is overlapped on the vehicular information by the information display portion and viewable on the viewing side,
the first reflective portion includes a recessed portion which is configured to reflect light, which is emitted from the first light source unit and conducted from an end side of the first display plate through the first display plate, to the viewing side to be illuminated in the first predetermined shape.

2. The vehicular display device according to claim 1, wherein
a the recessed portion is formed on a surface of the first display plate on a side of the information display portion,
the recessed portion becomes thinner to the viewing side, and
the first light source unit is located on the end side of the first display plate in a plate surface direction.

3. The vehicular display device according to claim 1, wherein
the first predetermined shape of the first reflective portion is a shape of a scale for indicating the vehicular information.

4. The vehicular display device according to claim 1, wherein
the first light source unit, the first display plate, and the first reflective portion form a first combination,
the vehicular display device further comprising:
a second light source unit, a second display plate, which has a second reflective portion, forming a second combination,
the second combination and the first combination are arranged in a direction from a side of the information display portion to the viewing side,
the second reflective portion is in a second predetermined shape, and
the first predetermined shape is different from the second predetermined shape.

5. A vehicular display device comprising:
a display plate including a pointer display portion configured to indicate vehicular information by using a pointer;
a light source unit;
an information display portion having a display surface configured to indicate an image of various vehicular information; and
a display plate being translucent and located on a viewing side relative to the display surface, wherein
the display plate has a reflective portion on a side, which corresponds to the display surface,
the reflective portion includes a recessed portion which is configured to reflect light, which is emitted from the light source unit and conducted from an end side of the display plate through the display plate, to the viewing side to be illuminated in a predetermined shape, and
the reflective portion is overlapped on the image indicated on the display surface and is viewable on the viewing side when being illuminated.

6. The vehicular display device according to claim 5 wherein
the display plate has a region corresponding to the pointer display portion, and
the region has an opening through which the pointer is inserted.

7. The vehicular display device according to claim 5, wherein
the recessed portion is recessed from a counter-viewing side of the display plate to the viewing side.

8. The vehicular display device according to claim 5, further comprising:
a control unit configured to control activation and deactivation of the light source unit, wherein
the control unit is configured to activate the light source unit to illuminate the reflective portion and to deactivate the light source unit to dim the reflective portion.

9. The vehicular display device according to claim 5, wherein
the reflective portion forms an ornamental portion of the image.

10. The vehicular display device according to claim 5, wherein
the reflective portion is formed in the display plate at a position around the image, and
the reflective portion does not conceal information indicated by the image.

11. A vehicular display device comprising:
a display plate including a pointer display portion configured to indicate vehicular information by using a pointer;
a light source unit;
an information display portion having a display surface configured to indicate an image of various vehicular information; and
a display plate being translucent and located on a viewing side relative to the display surface, wherein
the display plate has a reflective portion on a side, which corresponds to the display surface,
the reflective portion is configured to be illuminated in a predetermined shape by light emitted from the light source unit,
the reflective portion is overlapped on the image indicated on the display surface and is viewable on the viewing side when being illuminated, and
the reflective portion, which is formed in the display plate, forms a graphic pattern exhibiting, in combination with the image, a meaning for a viewer.

12. The vehicular display device according to claim 5, wherein
the reflective portion and characters in a character portion of the display plate form a combination in which the reflective portion is located between characters, which are adjacent to each other.

13. A vehicular display device comprising:
a display plate including a pointer display portion configured to indicate vehicular information by using a pointer;
a light source unit;
an information display portion having a display surface configured to indicate an image of various vehicular information; and
a display plate being translucent and located on a viewing side relative to the display surface, wherein
the display plate has a reflective portion on a side, which corresponds to the display surface,
the reflective portion is configured to be illuminated in a predetermined shape by light emitted from the light source unit,
the reflective portion is overlapped on the image indicated on the display surface and is viewable on the viewing side when being illuminated, and
the reflective portion and the image form a combination in which the reflective portion surrounds the image.

14. A vehicular display device comprising:
an information display portion having a display surface configured to indicate an image of vehicular information relevant to a vehicle;
a display plate being translucent, the display plate located on a viewing side relative to the display surface and distant from the display surface; and
a light source unit located on an end side of the display plate in a plate surface direction, wherein
the display plate has a reflective portion including a recessed portion,
the recessed portion is configured to reflect light, which is emitted from the light source unit and conducted from the end side of the display plate through the display plate, to the viewing side to be illuminated in a predetermined shape, and the light reflected by the reflective portion to the viewing side is overlapped on the vehicular information indicated by the information display portion.

15. The vehicular display device according to claim 14, wherein
the information display portion includes a liquid crystal panel.

16. The vehicular display device according to claim 14, wherein
the reflective portion forms an ornamental portion of the image.

17. The vehicular display device according to claim 14, wherein
the reflective portion is formed in the display plate at a position around the image, and
the reflective portion does not conceal information indicated by the image.

18. The vehicular display device according to claim 14, wherein
the reflective portion, which is formed in the display plate, forms a graphic pattern exhibiting, in combination with the image, a meaning for a viewer.

19. The vehicular display device according to claim 14, wherein
the reflective portion and characters in a character portion of the display plate form a combination in which the reflective portion is located between characters, which are adjacent to each other.

20. The vehicular display device according to claim 14, wherein
the reflective portion and the image form a combination in which the reflective portion surrounds the image.

21. A vehicular display device comprising:
a first display plate having a character portion;
an information display portion having a display surface configured to indicate an image of various vehicular information;
a second display plate being translucent, the second display plate distant from both the first display plate and the display surface and located on the viewing side; and
a light source unit located on an end side of the second display plate in a plate surface direction and configured to emit light when activated, wherein
the second display plate has a reflective portion including a recessed portion at a position corresponding to the character portion,
the recessed portion is configured to reflect light from the light source unit toward the viewing side to be illuminated in a predetermined shape, and
the reflective portion is configured to be overlapped on the character portion and viewable on the viewing side when being illuminated.

22. The vehicular display device according to claim 21, wherein
the reflective portion is located in the second display plate at a position corresponding to the display surface.

23. The vehicular display device according to claim 21, wherein
the recessed portion of the reflective portion is recessed from a counter-viewing side of the second display plate to the viewing side, and
the recessed portion has a sectional shape, which becomes thinner toward the viewing side to reflect light from the light source.

24. The vehicular display device according to claim 21, wherein
the reflective portion includes an aggregate of the recessed portion, which is not viewable in a state where the light source unit is not activated.

25. The vehicular display device according to claim 21, wherein
the reflective portion forms an ornamental portion of the image.

26. The vehicular display device according to claim 21, wherein
the reflective portion is formed in the second display plate at a position around the image, and
the reflective portion does not conceal information indicated by the image.

27. The vehicular display device according to claim 21, wherein
the reflective portion, which is formed in the display plate, forms a graphic pattern exhibiting, in combination with the image, a meaning for a viewer.

28. The vehicular display device according to claim 21, wherein
the reflective portion and characters in the character portion form a combination in which the reflective portion is located between characters, which are adjacent to each other.

29. The vehicular display device according to claim 21, wherein
the reflective portion and the image form a combination in which the reflective portion surrounds the image.

30. A vehicular display device comprising:
a display plate including a character portion;
an information display portion having a display surface configured to indicate an image of various vehicular information;
an opening portion through which the display surface is exposed and viewable;
a light source unit; and
a display plate being translucent, the display plate located on a viewing side relative to the display surface of the information display portion, wherein
the display plate has a reflective portion at a position corresponding to the display surface,
the reflective portion is configured to be illuminated in a predetermined shape when the light source unit is activated,
the reflective portion is configured not to be illuminated in the predetermined shape when the light source unit is deactivated,
the reflective portion includes a recessed portion which is configured to reflect light, which is emitted from the light source unit and conducted from an end side of the display plate through the display plate, to the viewing side to be illuminated in the predetermined shape,
the reflective portion is overlapped on the image and is viewable on the viewing side when the reflective portion is illuminated, and
the image is viewable through the display plate when the reflective portion is not illuminated.

31. The vehicular display device according to claim 30, wherein
the reflective portion is formed at a position corresponding to the character portion, and
the reflective portion is overlapped on the character portion and is viewable on the viewing side.

32. The vehicular display device according to claim 30, wherein the recessed portion of the reflective portion is recessed from a counterviewing side of the display plate to the viewing side, and the recessed portion has a sectional shape, which becomes thinner toward the viewing side to reflect light from the light source.

33. The vehicular display device according to claim 30, wherein the reflective portion forms an ornamental portion of the image.

34. The vehicular display device according to claim 30, wherein the reflective portion is formed in the display plate at a position around the image, and the reflective portion does not conceal information indicated by the image.

35. The vehicular display device according to claim 30, wherein the reflective portion, which is formed in the display plate, forms a graphic pattern exhibiting, in combination with the image, a meaning for a viewer.

36. A vehicular display device comprising:

a display plate including a character portion;

an information display portion having a display surface configured to indicate an image of various vehicular information;

an opening portion through which the display surface is exposed and viewable;

a light source unit; and a display plate being translucent, the display plate located on a viewing side relative to the display surface of the information display portion, wherein the display plate has a reflective portion at a position corresponding to the display surface, the reflective portion is configured to be illuminated in a predetermined shape when the light source unit is activated, the reflective portion is configured not to be illuminated in the predetermined shape when the light source unit is deactivated, the reflective portion is overlapped on the image and is viewable on the viewing side when the reflective portion is illuminated, the image is viewable through the display plate when the reflective portion is not illuminated, and the reflective portion and characters in the character portion form a combination in which the reflective portion is located between characters, which are adjacent to each other.

37. The vehicular display device according to claim 30, wherein the reflective portion and the image form a combination in which the reflective portion surrounds the image.

* * * * *